Jan. 13, 1970  J. G. GILES  3,488,956
VARIABLE HYDRAULIC TRANSMISSION
Filed May 13, 1968  2 Sheets-Sheet 1

INVENTOR
J. G. Giles
BY
ATTORNEY

Jan. 13, 1970   J. G. GILES   3,488,956
VARIABLE HYDRAULIC TRANSMISSION
Filed May 13, 1968

INVENTOR
J. G. Giles.

United States Patent Office 3,488,956
Patented Jan. 13, 1970

3,488,956
VARIABLE HYDRAULIC TRANSMISSION
John George Giles, Reed Lea, 12 Whittington Road,
Worcester, England
Filed May 13, 1968, Ser. No. 728,398
Claims priority, application Great Britain, Jan. 4, 1968, 544/68
Int. Cl. F16d 31/00, 33/00
U.S. Cl. 60—53        7 Claims

ABSTRACT OF THE DISCLOSURE

An hydraulic transmission having an input shaft and an output shaft together with an hydraulic pump and an hydraulic motor which each include a shaft, a rotor mounted thereon, and a body having a rotor control member movably mounted in the body, the pump shaft forming or being connected to said input shaft whilst the pump body and motor body are connected to the output shaft for rotation therewith, the motor shaft and motor rotor held against rotation and means being provided for directing the output of the pump into the motor.

---

Figure 1:
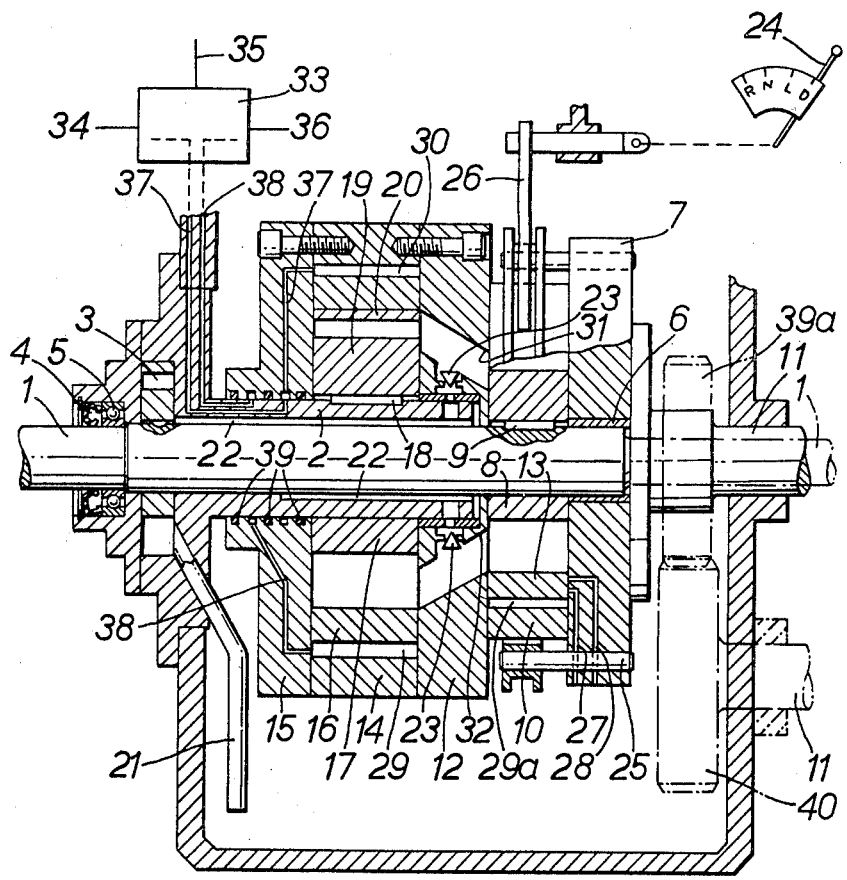

This invention relates to hydraulic power transmissions of the kind including an engine driven hydraulic pump and an hydraulic motor and has as one of its objects the provision of such a transmission in an improved form. Another object of the invention is to provide an hydraulic transmission in which a part of the power input is transmitted to an output shaft by mechanical means. Yet another object of the invention is to provide such a transmission in which manual control of the pump together with automatic control of the motor can be achieved in a relatively simple manner. A further object of the invention is to provide effective means for priming the transmission on starting.

With these objects in view, there is provided in accordance with the invention an hydraulic transmission which comprises an hydraulic pump, an hydraulic motor and means for directing the output of the pump into the motor, said pump and motor each including a shaft, a rotor mounted thereon, and a body having a rotor control member movably mounted in the body, the rotor and rotor control member being arranged for relative otation and the rotor control member being movable relative to the body to vary the output of the pump (in the case of the pump) or the input of the motor (in the case of the motor), wherein there is provided an output shaft which is connected to the pump and motor bodies so that said bodies are rotatable with the output shaft, the pump shaft acting as an input shaft and the motor shaft and motor rotor being held against rotation.

Conveniently, the pump rotor and the motor rotor are each of the type incorporating slidably mounted vanes (which may be in the for of so-called slipper vanes) for pumping and motoring duties, although the hydraulic motor may have a different fluid displacement from that of the pump. In both pump and motor units, the rotor may have three arms, each arm engaging in a slot in one of three slipper-vanes. The slipper-vanes are shaped so that they will slide around the inside of the rotor control member in the form of a guide ring or vane track which may be eccentric to the rotor shaft, the vanes maintaining contact with the rotor by reason of the rotor arm sliding in the slot in each slipper-vane.

Input from an engine (such as an internal combustion engine) is transmitted via the input shaft which is connected to, or is an extension of, the pump rotor shaft. The pump rotor is mounted on this shaft and engages with the slipper-vanes which are thus driven round the vane track, or guide ring, which is slidably mounted in the pump body. This pump body is rigidly fixed to the body of the hydraulic motor and these bodies are free to rotate, being supported in bearings and mounted within a main transmission case. Output from the transmission is obtained from these rotating bodies which may be connected directly to an output shaft or may drive an output shaft through the intermediary of a gear train.

In this hydromechanical arrangement, the rotor shaft of the hydraulic motor is held stationary and is rigidly fixed to the outer transmission casing. As a matter of convenience, this shaft may also provide some of the support needed for the rotating parts. The slipper-vanes, and rotor of this motor must, of course, remain stationary with the rotor shaft, but the motor body and its slidable guide ring are able to rotate outside and around these stationary parts.

Fluid is pumped from the pump to the motor and completes its working cycle by means of the normal inlet and outlet ports associated with slipper-vane hydraulic units. Connecting ports and passages are provided in the rotating parts so that a normal flow and return of fluid between pump and motor can take place. In this particular arrangement, fluid admitted at pressure to the hydraulic motor causes the motor body to rotate bodily around the stationary rotor shaft. Output torque developed in the hydraulic motor is transmitted directly to the ouput shaft in this way but in addition, a reaction torque developed on the pump body is also transmitted to output, because the pump and motor bodies are connected together.

Control of the transmission ratio is achieved by means of the motor guide ring which may be varied from a full positive eccentricity (maximum fluid delivery) through zero eccentricity, (and zero fluid delivery) to a small negative eccentricity setting. The benefit of the hydromechanical arrangement is most easily seen when the hydraulic motor guide ring is set to the zero delivery (concentric) position. At this setting no fluid flow can pass through the hydraulic motor and the outlet from the pump unit is effectively blocked. Rotation of the input shaft (i.e. pump shaft) causes the pump body to rotate with this shaft and hence to drive the output shaft at the same speed. A mechanical, direct-drive condition is thus achieved by preventing fluid flow from the pump and this fluid lock is effected as stated above by adjusting the motor guide ring to the concentric position. Fluid is pressurised in the pump and there may be some small fluid leakage in this condition, but the transmission operates as a direct mechanical drive without hydraulic flow, transmitting an output torque equal to input torque with good efficiency.

As the motor guide ring is moved to a small positive eccentricity, the pump is able to deliver a small quantity of fluid so that the pump body and hence output shaft rotate at a lower speed than the input shaft. The motor body is then driven around its stationary shaft, adding some additional output torque to the combined rotating bodies and output shaft. With a further increase in motor ring eccentricity, the relative motion between the input shaft and pump body increase, an dextra fluid flow balances the increased demand from the motor, which, operating at a larger eccentricity, adds further torque to the output shaft.

Finally, at maximum motor eccentricity setting the output shaft and bodies rotate a a low speed. Fluid delivery from the pump is high because of the difference between pump rotor speed and pump body speed. Total output torque at this setting is equal to maximum motor torque plus pump reaction torque. The hydromhecanical arrangement thus permits some reduction in motor size or operating pressures in addition to the provision of a mechanical direct drive setting.

A fixed pump delivery setting has been assumed for all the above conditions. However, the pump guide ring may also be moved in slides permitting movement in a direction normal to the axis of port symmetry. The pump delivery setting may be adjusted to extend the range of transmission operation so as to obtain lower output speeds, a neutral setting and reverse operation. Conveniently, the pump guide ring is arranged to operate at a number of fixed settings. For reverse operation, the pump reaction torque opposes the motor output torque and a small negative pump eccentricity setting is employed so that motor reverse torque is much larger than the opposing pump forward torque.

The output speed and torque of the transmission are mainly determined by the position of the motor guide ring, which controls the amount of fluid circulating per revolution of the output shaft although the position of the pump guide ring has an influence on the range of transmission ratios obtainable. It is possible to predict the output speed from the motor guide ring position as follows:

If the output shaft is rotating at $x$ times the speed of the input shaft then the relative pump speed is equal to $(1-x)$ and the fluid displaced by the pump is proportional to this factor. Now if the motor guide ring is set so that the motor displacement per revolution is $n$ times that displaced by the pump per revolution, then the fluid displaced by the motor will be proportional to the factor $(nx)$.

Hence $nx=1-x$, because fluid leaving pump is the same as that entering motor, and the speed ratio $$x = \frac{1}{1+n}$$

The output speed of the transmission can thus be determined from this expression which is valid for positive and and negative values of $n$.

A "neutral" setting of the pump is obtained by moving the pump guide ring to a zero delivery position and two forward settings are obtained at approximately half positive pump eccentricity and at maximum positive pump eccentricity respectively.

The position of the pump guide ring is conveniently selected in one of these four settings by a manual lever although hydraulic servo assistance may be provided to reduce the mechanical loads if necessary.

The position of the motor guide ring on the other hand is preferably determined by an automatic control which may select any motor guide ring setting within a range from maximum positive eccentricity (low gear) to a small negative eccentricity (overdrive gear), such automatic control incorporating a hydraulic servo type valve assembly, spaces between the motor casing and the motor guide ring being employed as servo chambers so that fluid can be admitted to one chamber and released from the other (and oppositely disposed) chamber to move this guide ring to the desired position.

The transmission would be employed with the usual ancillary equipment and controls such as an additional charging or boost pump drawing fluid from a sump reservoir and supplying the pump and motor units with a flow of fluid to replenish any external loss of fluid from the rotating parts. This supply could be taken into the transmission by way of the stationary motor shaft. An uncoupling valve may be employed for automatic starting of the vehicle, and this would consist of a by-pass circuit which permits a restricted flow for starting, the circuit being closed automatically when the transmission is rotating at a pre-determined speed perhaps by a centrifugally operated valve. A relief valve may be incorporated to limit the level of fluid pressure. The automatic control for determining the position of the motor guide ring would desirably be sensitive to engine speed, engine torque, and an operator's control, such as a driver's accelerator pedal position. In some smaller versions of the transmission it may be possible to move the motor guide ring by direct forces obtained from springs and centrifugal forces developed on bobweights, or on the guide ring as it rotates eccentrically.

It is possible that this transmission would be employed in conjunction with some additional gearing which may be introduced as an alternative means of obtaining reverse gear, to increase the operating range of transmission ratios, or to change the position of the output shaft.

The invention is illustrated by way of example in the accompanying drawings wherein—

Figure 2:
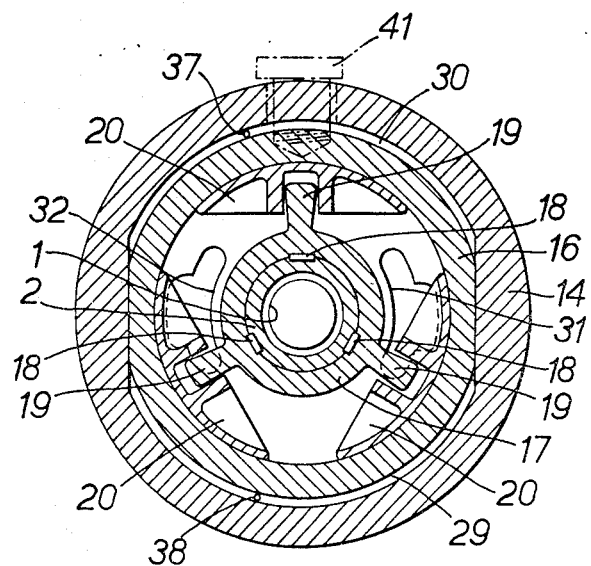
Figure 3:
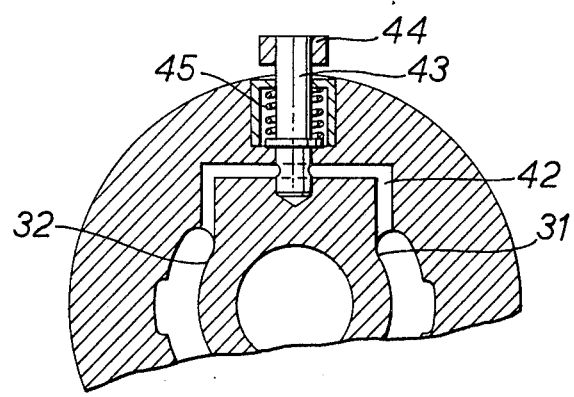

FIGURE 1 shows a longitudinal part sectional view of a transmission in accordance with the invention, FIGURE 2 shows a cross-sectional view of the motor unit which forms part of the transmission seen in FIGURE 1, FIGURE 3 shows a part-sectional view of a rotary port plate which also forms part of the transmission seen in FIGURE 1, and illustrates the coupling valve employed for automatic connection and disconnection of the transmission.

Referring to FIGURE 1, the transmission shown therein includes an input shaft 1 which may be driven (as by means of an internal combustion engine) from either end. Said input shaft 1 runs concentrically inside a stationary motor shaft 2 which is integral with a mounting flange containing a small boost pump 3 and supporting an input shaft seal 4 and a bearing 5 for one end of the input shaft. The other end of the input shaft is supported by a bearing 6 which is housed in an end plate 7 which, together with a pump body 10 and port plate 12, forms the casing of a pump unit, the rotor of which is indicated by reference numeral 8. Said rotor is rigidly fixed to the input shaft 1 by means of a key 9 whilst the aforesaid pump casing is connected to an output shaft 11 so as to be rotatable relative to the input shaft 1.

The port plate 12 also acts as an end plate for a motor unit having a motor body 14 and a further end plate 15, the parts 12, 14 and 15 all being connected together and to the aforesaid pump body 10 and end plate 7 so as to be rotatable as one with the output shaft 11 realtive to the input shaft. The pump rotor 8 is rotatable with the input shaft 1 but the corresponding part of the motor unit, hereinafter referred to for convenience as the motor "rotor" 17, having arms 19, is rigidly fixed to the shaft 2 by means of a key 18 and is therefore stationary.

A pump rotor control member in the form of a pump guide ring 13 is slidably mounted inside the pump body 10 and this guide ring may be moved so that its centre can be offset on either side of the rotor centre. Similarly, the motor body 14 is shaped so that a motor rotor control member in the form of a motor guide ring 16 can slide within this body so that the guide ring centre can be offset to either side of the motor rotor centre. Each arm 19 of the motor rotor 17 engages with a slot formed in one of the slipper-vanes 20 which are in contact with and rotate around and inside said motor guide ring 16.

The pump rotor 8 is provided with slipper-vanes in the same way as for the motor rotor, and these slipper-vanes are in contact with, and rotate around and inside the pump guide ring 13.

On starting, when the input shaft 1 is rotated, the boost pump 3 draws fluid through its inlet pipe 21 and pumps it through the passage 22 existing between the input shaft and motor shaft through drillings and non-return valves 23 to pressurise the whole pump and motor assembly. There is also provided a manual control 24 which can be adjusted to move a vent valve 25 by means of sliding fork and ring assembly 26 so that a vent in this valve is presented either to a connecting duct 27 or duct 28, in order that one of two chambers (one of which being indicated by reference numeral 29a in FIGURE 1) between the pump body 10 and opposite sides of the guide ring 13 can be vented to atmospheric pressure. The fluid pressure in the other chamber then moves the guide ring until it covers the vented duct. In this way the pump guide ring 13 can be positioned at any one of a number of predetermined settings. The rotation of the pump rotor 8 and slipper-vanes consequent upon rotation of the shaft 1 causes fluid to be pumped through the main ports 31 and 32 of the port plate 12. The relative pumping speed of the pump rotor is equal to difference between the input speed and the output speed of the transmission, because the pump body 10 rotates with the output shaft 11. Fluid passing into the motor unit causes the motor casing to rotate around the stationary motor shaft 2. The motor guide ring 16 also rotates but the rotor 17 and slipper-vanes 20 remain stationary but slide relative to each other as the guide ring rotates so that said slipper-vanes remain in contact with the guide ring 16.

The position of the motor guide ring 16 is determined by an automatic control 33 which is a valve assembly shown schematically in FIGURE 1 and which is sensitive to engine speed 34, engine torque 35 and the engine throttle (or accelerator pedal) position 36. As previously mentioned, motor guide ring 16 is slidable in motor body 14 and its position can be adjusted by admitting pressurised fluid (supplied by the boost pump) into one or the other of two chambers 29 and 30 (see FIGURES 1 and 2) formed between said body 14 and opposite sides of the guide ring 16. The aforesaid automatic control 33 is therefore arranged to supply such pressurised fluid to said chambers 29 and 30 by means of ducts 37 and 38, rotating seals 39 being provided to connect non-rotating parts of such ducts with rotating parts. Thus duct 37 can be used to admit fluid to chamber 30 whilst duct 38 will carry fluid exhausted from chamber 29, the guide ring 16 then being moved towards chamber 29. The guide ring 16 may be moved in the opposite direction by admitting fluid to chamber 29 via duct 38 and releasing fluid from chamber 30 via duct 37. In an alternative version a simpler control may be devised by using a centrifugal bob weight 41, shown dotted in FIGURE 2, which tends to move the motor guide ring 16 by centrifugal force against springs (not shown) or fluid pressure in one or both of the chambers 29 and 30.

FIGURE 3 shows a section through part of the port plate 12 in which the main ports 31, 32 are connected by a duct 42 which can be used to permit flow of fluid between these ports to disconnect the transmission. A valve 43 is provided to restrict this flow so that a pressure difference develops across these ports 31 and 32 when the rate of flow increases. As pressure develops, the output shaft 11 and hence the port plate 12 start to rotate. A centrifugal bob weight 44 displays the valve outwardly against the load of a spring 45 causing further restriction to flow and thus a resulting increases in pressure difference. Eventually this valve 43 closes the duct 42 and the transmission is fully connected. When the output shaft and hence the port plate 12 slows to a relatively low speed, the spring 45 returns the valve to its open position, disconnecting the transmission and permitting the input shaft to rotate when the output shaft is stationary.

Output from the transmission may be taken via gears 39a and 40, shown dotted in FIGURE 1, if it is desired to change the position or speed range of the output shaft.

Having thus described my invention what I claim as new and desire to secure by Letters Patent is:

1. An hydraulic transmission comprising an hydraulic pump, an hydraulic motor and means for directing the output of the pump into the motor, said pump and motor each including a shaft, a rotor mounted thereon, and a body having a rotor control member movably mounted in the body the rotor and rotor control member being arranged for relative rotation and the rotor control member being movable relative to the body to vary the output of the pump ( in the case of the pump) or the input of the motor (in the case of the motor), wherein there is provided an output shaft which is connected to the pump and motor bodies so that said bodies are rotatable with the output shaft, the pump shaft acting as an input shaft and the motor shaft and motor rotor being held against rotation.

2. An hydraulic transmission as claimed in claim 1 wherein the pump rotor and the motor rotor each incorporate slidably mounted vanes and wherein each rotor control member comprises a vane guide ring which is slidably mounted in the body so that when the guide ring is eccentrically disposed with respect to the axis of the associated rotor shaft, relative rotation between the rotor and the guide ring will result in sliding of the vanes relative to the rotor.

3. An hydraulic transmission as claimed in claim 2 wherein there are provided manually operable control means for adjusting the position of the pump guide ring relative to the pump shaft, and automatically operable control means for adjusting the position of the motor guide ring relative to the motor shaft.

4. An hydraulic transmission as claimed in claim 3 wherein a chamber is provided between the pump body and each of two opposite sides of the pump guide ring, a chamber being also provided between the motor body and each of two opposite sides of the motor guide ring, whereby the pump guide ring and the motor guide ring can be moved relative to the pump shaft and the motor shaft respectively by admitting pressurised fluid to one of the pair of associated chambers whilst exhausting fluid from the other chamber.

5. An hydraulic transmission as claimed in claim 1 wherein there is provided a boost pump which is connected to the input shaft of the transmission so as to be operable by said input shaft when the latter commences to rotate the prime said hydraulic pump on starting.

6. An hydraulic transmission as claimed in claim 2 wherein there is provided centrifugally operable means for displacing the pump control ring relative to the pump shaft or the motor control ring relative to the motor shaft.

7. An hydraulic transmission as claimed in claim 1 wherein there is provided a port plate rotatable with the output shaft and which is disposed between the hydraulic pump and the hydraulic motor and which is provided with a pair of main ports arranged to direct flow of fluid between the hydraulic pump and the hydraulic rotor, said port plate having a by-pass passage which interconnects said main ports, there being provided a valve which is disposed in said by-pass passage and which is connected to centrifugally operable means arranged to displace the valve into a position in which the by-pass passage is closed when the output shaft, after starting from rest, reaches a pre-determined speed.

References Cited

UNITED STATES PATENTS 2,535,267 12/1950 Cline.
2,680,348 6/1954 Wahlmark.
3,403,513 10/1968 Jaquish.

EDGAR W. GEOGHEGAN, Primary Examiner

U.S. Cl. X.R.

60—19